(12) United States Patent
Kondo

(10) Patent No.: US 7,433,099 B2
(45) Date of Patent: Oct. 7, 2008

(54) IMAGE SENSING APPARATUS, IMAGE SENSING METHOD, PROGRAM, AND STORAGE MEDIUM

(75) Inventor: Hiroshi Kondo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1075 days.

(21) Appl. No.: 10/425,258

(22) Filed: Apr. 29, 2003

(65) Prior Publication Data

US 2003/0206319 A1 Nov. 6, 2003

(30) Foreign Application Priority Data

May 1, 2002 (JP) .............................. 2002-129797

(51) Int. Cl.
*H04N 1/46* (2006.01)
(52) U.S. Cl. .................... 358/516; 358/513; 358/530; 358/443; 358/448; 348/299; 348/317; 348/222.1; 348/231.6; 348/251
(58) Field of Classification Search .................. None
See application file for complete search history.

(56) References Cited

U.S. PATENT DOCUMENTS

| | | | | |
|---|---|---|---|---|
| 6,011,583 | A * | 1/2000 | Hieda et al. ............... | 348/220.1 |
| 6,342,921 | B1 * | 1/2002 | Yamaguchi et al. ......... | 348/322 |
| 6,507,365 | B1 * | 1/2003 | Nakamura et al. .......... | 348/296 |
| 6,559,889 | B2 * | 5/2003 | Tanaka et al. ............... | 348/299 |
| 6,567,123 | B1 * | 5/2003 | Hashimoto ............... | 348/229.1 |
| 6,621,519 | B2 * | 9/2003 | Nakayama et al. ....... | 348/223.1 |
| 6,778,216 | B1 * | 8/2004 | Lin ........................ | 348/333.11 |
| 6,809,764 | B1 * | 10/2004 | Misawa et al. .............. | 348/272 |
| 6,930,710 | B1 * | 8/2005 | Classen et al. ........... | 348/223.1 |
| 6,937,277 | B1 * | 8/2005 | Hattori et al. ............... | 348/304 |
| 6,967,680 | B1 * | 11/2005 | Kagle et al. .............. | 348/222.1 |
| 7,116,358 | B1 * | 10/2006 | Sasaki ..................... | 348/222.1 |
| 7,190,396 | B2 * | 3/2007 | Sasaki ........................ | 348/254 |
| 2003/0048366 | A1 | 3/2003 | Kondo ................... | 348/231.99 |
| 2004/0105016 | A1 * | 6/2004 | Sasaki ..................... | 348/222.1 |

FOREIGN PATENT DOCUMENTS

| | | | |
|---|---|---|---|
| JP | 2278984 | | 11/1990 |
| JP | 2278984 | A * | 11/1990 |
| JP | 9130814 | | 5/1997 |
| JP | 9130814 | A * | 5/1997 |
| JP | 10136244 | | 5/1998 |

(Continued)

*Primary Examiner*—Twyler L. Haskins
*Assistant Examiner*—Pawandeep S Dhingra
(74) *Attorney, Agent, or Firm*—Morgan & Finnegan, LLP

(57) ABSTRACT

An object of this invention is to quickly complete white balance calculation in photographing. To achieve this object, an image sensing apparatus includes an image sensing element in which a line on which first and second color filters are arranged and a line on which first and third color filters are arranged are alternately arrayed on pixels, an image sensing controller which forms an image of one frame by n fields (n is an odd number), and reads out pixel data of the image sensing element so as to contain all color components in each 1-field period, a white balance calculation device which performs process on the basis of image data read out from the image sensing element by the image sensing controller, and starts the process before read of one frame from the image sensing element is completed by the image sensing controller.

9 Claims, 11 Drawing Sheets

FOREIGN PATENT DOCUMENTS

| | | |
|---|---|---|
| JP | 2000201355 | 7/2000 |
| JP | 2001231003 | 8/2001 |
| JP | 2001285688 | 10/2001 |
| JP | 2003087803 | 3/2003 |
| JP | 2003224856 | 8/2003 |
| JP | 2003224857 | 8/2003 |
| JP | 2003284085 | 10/2003 |

* cited by examiner

IMAGE SENSING APPARATUS, IMAGE SENSING METHOD, PROGRAM, AND STORAGE MEDIUM

FIELD OF THE INVENTION

The present invention relates to an image sensing apparatus and, more particularly, to an image sensing apparatus which performs white balance calculationin photographing.

BACKGROUND OF THE INVENTION

There have been commercially available digital cameras each of which uses a memory card having a solid-state memory element as a recording medium, and records and plays back still and moving images sensed by a solid-state image sensing element such as a CCD. Such digital camera generally performs photographing processing of temporarily storing output data from an image sensing element in a buffer memory, and developing/compression processing of executing image processing and compression processing for the stored data and storing the data in the buffer memory again. The resultant data are written in a removable recording medium.

Various algorithms have been proposed for white balance (WB) control for a recording image, and WB control is executed as follows. After photographing, raw data which is output from an image sensing element, stored in a memory, and not subjected to signal processing is read out. A coefficient for each color that is determined by the color filter of the image sensing element is decided by a predetermined algorithm (this processing will be referred to as WB calculation hereinafter). A WB coefficient obtained as a result of calculation is multiplied to correct white data. After that, developing/compression processing is done.

Image sensing elements are classified into a progressive scanning type of line-sequentially reading out data from all pixels, and an interlaced read type of reading out data every other line in two fields.

In a conventional multi-field read method, WB calculation starts after raw data of one frame are written in a memory.

According to this method, read from the image sensing element and WB calculation can only sequentially operate. This does not generate a time lag until exposure starts after the shutter button is pressed, but takes a long time until an image confirmation display appears after photographing. In sequential shooting, the WB coefficient for the first image can be adopted. However, the first image undergoes WB calculation after raw data of one frame are stored in the buffer memory after photographing. The photographing interval between the first and second images becomes longer than the photographing interval between the second and subsequent images.

To solve this, the present applicant has proposed a method of reading out one frame in two fields and executing WB calculation during read of the second field, as disclosed in Japanese Patent Application No. 2001-273014 (US patent application Ser. No. 10/238,332, US filing date: Sep. 9, 2002). A multi-field read type image sensing element which reads out one frame in more than two fields, e.g., three or more fields can effectively utilize the light-receiving portion. While the sensor size is suppressed small, the number of pixels can be increased. It is therefore an object of the present invention to provide an improvement of the prior invention.

SUMMARY OF THE INVENTION

The present invention has been made to overcome the conventional drawbacks, and has as its object to quickly complete white balance calculation after photographing.

To solve the above-described problem and achieve the object, according to the first aspect of the present invention, there is provided an image sensing apparatus comprising:

an image sensing element which outputs first, second, and third color components of color filters on pixels in one field;

an image sensing controller which forms an image of one frame by n fields (n is an odd number of not less than 3), and reads out pixel data of the image sensing element so as to contain all color components in each 1-field period; and a processing device which performs processing on the basis of the pixel data read out from the image sensing element by the image sensing controller, wherein the processing device starts the image processing by the processing device before read of one frame from the image sensing element is completed by the image sensing controller.

According to the second aspect of the present invention, there is provided an image sensing method using an image sensing apparatus having an image sensing element which outputs first, second, and third color components of color filters on pixels in one field, comprising:

controlling an image sensing element to form an image of one frame by n fields (n is an odd number of not less than 3), and read out pixel data of the image sensing element so as to contain all color components in each 1-field period; and executing a process to execute the process on the basis of the pixel data read out from the image sensing element, wherein the process starts before read of one frame from the image sensing element is completed.

According to the third aspect of the present invention, there is provided a program causing a computer to execute the image sensing method.

According to the fourth aspect of the present invention, there is provided a storage medium computer-readably storing the program.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will be described in detail below with reference to the accompanying drawings.

First Embodiment

Figure 1:
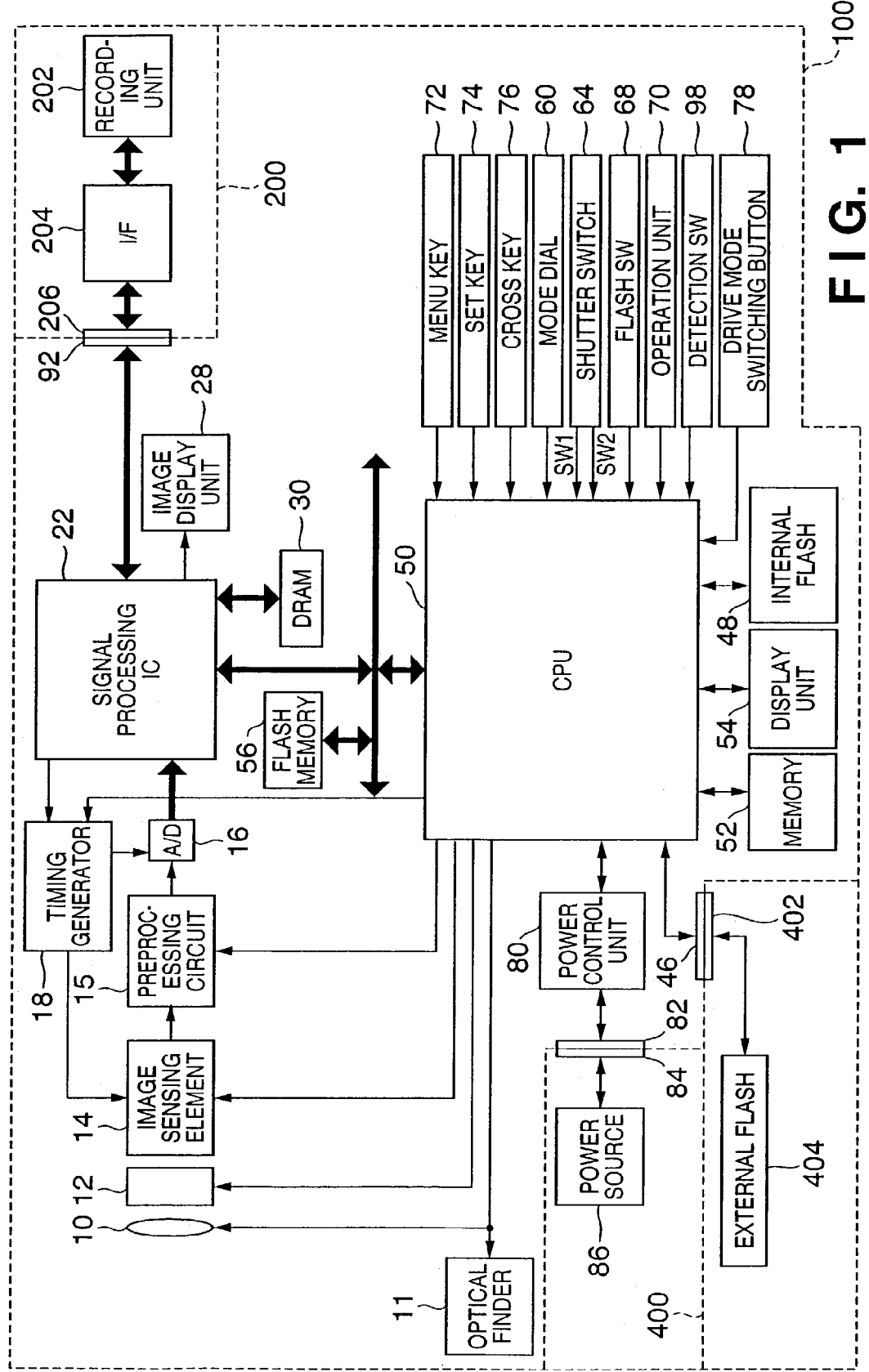
FIG. 1 is a block diagram showing the arrangement of a digital camera system according to an embodiment of the present invention.

FIG. 1 is a block diagram showing the arrangement of a digital camera system using a 3-field read type image sensing element according to the first embodiment of the present invention.

In FIG. 1, reference numeral 100 denotes a digital camera apparatus; 10, a photographing lens; 11, an optical finder which allows the user to confirm an object image and can change the view angle in accordance with zoom control; 12, a stop/shutter having a stop function; and 14, an image sensing element which converts an optical image into an electrical signal and uses a CCD (Charge Coupled Device). A primary-color mosaic filter is set on this element. Reference numeral 15 denotes a preprocessing circuit which incorporates a CDS (Correlation Double Sampling) circuit and AGC (Automatic Gain Control) circuit for removing output noise from the image sensing element 14; and 16, an A/D converter which converts an analog signal output from the preprocessing circuit 15 into a digital signal.

Reference numeral 18 denotes a timing generator (TG) which supplies a clock signal and control signal to the image sensing element 14 and A/D converter 16. The timings of these signals are controlled by a signal processing IC 22.

The signal processing IC 22 performs predetermined pixel interpolation processing, color conversion processing, enlargement/reduction, and image data format conversion for data from the A/D converter 16 or data from a DRAM 30 in accordance with an instruction from a CPU 50. The signal processing IC 22 incorporates a DMA controller, a D/A converter, and a compression/decompression circuit for compressing/decompressing image data. The signal processing IC 22 further performs predetermined calculation processing using sensed image data, and saves the obtained calculation result in the DRAM 30. The CPU 50 performs TTL AWB (Auto White Balance) processing, AF (Auto Focus) processing, AE (Auto Exposure) processing, and EF (pre-flash) processing on the basis of the calculation result.

Reference numeral 28 denotes an image display unit comprised of a TFT LCD or the like. Display image data written in the DRAM 30 is displayed on the image display unit 28 via the D/A converter (not shown) in the signal processing IC 22.

The image display unit 28 is used to display various pieces of information and a mode setting status in addition to an image.

An electronic finder function can be realized by sequentially displaying sensed image data by using the image display unit 28.

The image display unit 28 arbitrarily turns on/off its display in accordance with an instruction from the CPU 50. If the display is turned off, the electric consumption of the digital camera apparatus 100 can be greatly reduced.

The image display unit 28 is coupled to a camera main body via a rotatable hinge. The image display unit 28 can be set in a free direction at a free angle, and allows the user to use the electronic finder function, playback display function, and various display functions.

The display of the image display unit 28 can be protected and stored by directing it toward the camera main body. In this case, the storage state is detected by a detection SW 98, stopping display operation of the image display unit 28.

The DRAM 30 is a memory used to temporarily store sensed/uncompressed data, hold AF/AE/AWB/EF calculation results, hold a display image on the image display unit 28, and hold compressed image data. The DRAM 30 has a memory amount enough to store a predetermined number of still images and a moving image for a predetermined time.

Reference numeral 46 denotes a connector which is also called an accessory shoe and comprises an electrical contact and mechanical fixing device for an external flash device 400.

Reference numeral 48 denotes an internal flash having a TTL light control function.

The CPU 50 controls the overall digital camera apparatus 100. The CPU 50 executes AF/AE/AWB/EF control on the basis of the AF/AE/AWB/EF calculation results stored in the DRAM 30. In addition, the CPU 50 performs data flow control with respect to the signal processing IC 22, various key scanning operations, zoom control, and communication with a peripheral module.

Reference numeral 52 denotes a memory which stores variables and the like for operating the CPU 50.

Reference numeral 54 denotes a display unit including a liquid crystal display device and loudspeaker which display and output operating statuses, messages, and the like by using characters, images, sound, and the like in accordance with execution of a program by the CPU 50. One or a plurality of display units 54 are arranged at easy-to-see positions near the operation unit of the digital camera apparatus 100. Each display unit 54 includes a combination of an LCD, LED, sound generating element, and the like.

The display contents of the display unit 54 include indication of single-shot/sequential shooting, indication of a self timer, a compression ratio, the number of recording pixels, the number of recorded images, the number of recordable images, a shutter speed, an f-number, exposure compensation, flash illumination, pink-eye effect mitigation, macro photographing, a buzzer-set state, a remaining timer battery level, a remaining battery level, an error state, information of plural digit numbers, the attached/detached status of a recording medium 200, the operation of a communication I/F, and date and time.

Reference numeral 56 denotes an electrically erasable and recordable flash memory in which programs necessary to operate the CPU 50, camera-dedicated adjustment data, and the like are written in advance.

Main operation devices will be described in detail below.

Reference numeral 60 denotes a mode dial switch having a two-stage structure in which the lower stage has three states: a power-off (OFF) mode, photographing mode, and playback mode, and the upper stage is assigned various photographing modes set by the user in accordance with the photographing purpose and scene. The mode dial switch 60 allows switching and setting modes such as a full automatic photographing mode (AUTO), a program photographing mode, a shutter speed priority photographing mode, a stop priority photographing mode, a manual photographing mode, a pan-focus mode, a portrait mode, a landscape mode, a night view mode, a color effect mode, a stitch assist mode, and a moving image photographing mode.

Reference numeral 64 denotes a shutter switch which is comprised of two switches SW1 and SW2. The switch SW1 is turned on by half stroke of the shutter button to designate the start of the operations of AF (Auto Focus) processing, AE (Auto Exposure) processing, AWB (Auto White Balance) processing, and the like. The shutter switch SW2 is turned on by full stroke of the shutter button to write a signal read out from the image sensing element 14 as image data in the DRAM 30 via the A/D converter 16 and signal processing IC 22. The signal processing IC 22 reads out image data from the DRAM 30 in accordance with an instruction from the CPU 50, and performs image processing such as color correction, pixel interpolation, or color conversion. The signal processing IC 22 then performs compression processing, and writes the data on the recording medium 200.

Reference numeral 68 denotes a flash SW which switches the flash mode in photographing to forcible light emission, no-light emission, and automatic light emission.

Reference numerals 72, 74, and 76 denote a menu key, set key, and cross key. With a combination of these keys, the user can change various settings or execute functions in photographing or playback while checking the image display unit 28. The cross key is a composite key comprised of four, up, down, right, and left direction keys.

By pressing the menu key 72 once, the image display unit 28 displays a menu window. This menu window changes depending on the current mode designated by the mode dial switch 60. A displayed menu item is selected by using the cross key 76, and decided by pressing the set key 74.

For example, when the photographing mode is the program photographing mode, menu items are the recording pixel size, compression ratio, recording format, sensitivity, AF mode, confirmation/non-confirmation of photographing, and image quality tuning parameter.

Menu items in playback are erase of (one or all) images, image protection, and image rotation setting.

The cross key 76 is used for processing other than menu setting. For example, when the shutter speed priority mode is set by the mode dial switch 60, the shutter speed can be changed using the right and left direction keys of the cross key. In the playback mode, the right and left direction keys are used to feed images.

Reference numeral 78 denotes a drive mode switching button which cyclically switches between the single-shot, sequential shooting, and the self-timer every time the button is pressed; and 70, an operation unit having, except the above-described buttons, a zoom lever, a photometry mode switching button, a macro button, an AE lock button, a multi-window reproduction/repaging button, an exposure correction button, a light correction button, a date/time setting button, a selection/switching button for setting selection and switching of various functions in executing photographing and reproduction such as a panoramic mode, and an image display ON/OFF switch for setting the ON/OFF state of the image display unit 28. The operation unit is assigned items with relatively high use frequencies out of items contained in the menu.

Reference numeral 80 denotes a power control unit which comprises a battery detection circuit, a DC/DC converter, a switch circuit for switching a block to be energized, and the like. The power control unit 80 detects the attached/detached state of the battery, a battery type, and a remaining battery power level. The power control unit 80 controls the DC/DC converter on the basis of detection results and an instruction from the CPU 50, and supplies a necessary voltage to respective parts including a recording medium for a necessary period. If necessary, the power control unit 80 displays the remaining battery power level on the display unit 54 and image display unit 28.

Reference numerals 82 and 84 denote connectors; and 86, a power source including a primary battery such as an alkaline battery or lithium battery, a secondary battery such as an NiCd battery, NiMH battery, or Li battery, an AC adaptor, and the like.

Reference numeral 92 denotes a connector which connects the digital camera apparatus 100 and a recording medium such as a memory card and hard disk.

The first embodiment employs one system of an interface and connector for connecting a recording medium. However, one or a plurality of systems of interfaces and connectors for connecting a recording medium may be arranged. Further, interfaces and connectors with different standards may be combined.

As the interfaces and connectors, cards in conformity with PCMCIA card standards and cards in conformity with CF (Compact Flash®) card standards may be used.

The detection SW 98 includes an image display unit opening/closing detection device capable of detecting whether the image display unit 28 is stored with its display facing the digital camera apparatus 100, a battery lid opening/closing detection device which detects that the battery lid is open, and a mounting state detection device for an external flash 404.

The recording medium 200 is a memory card, hard disk, or the like.

The recording medium 200 has a recording unit 202 which is comprised of a semiconductor memory, magnetic disk, or the like, an interface 204 for the digital camera apparatus 100, and a connector 206 for connecting the digital camera apparatus 100.

In the first embodiment, the external flash device 400 is so constituted as to allow mounting an external flash later in addition to the internal flash 48. Similar to the internal flash, the external flash device 400 can perform TTL light control photographing. Reference numeral 402 denotes a connector for connecting the accessory shoe of the digital camera apparatus 100. The external flash 404 has an AF auxiliary light projection function and flash light control function.

Figure 2:
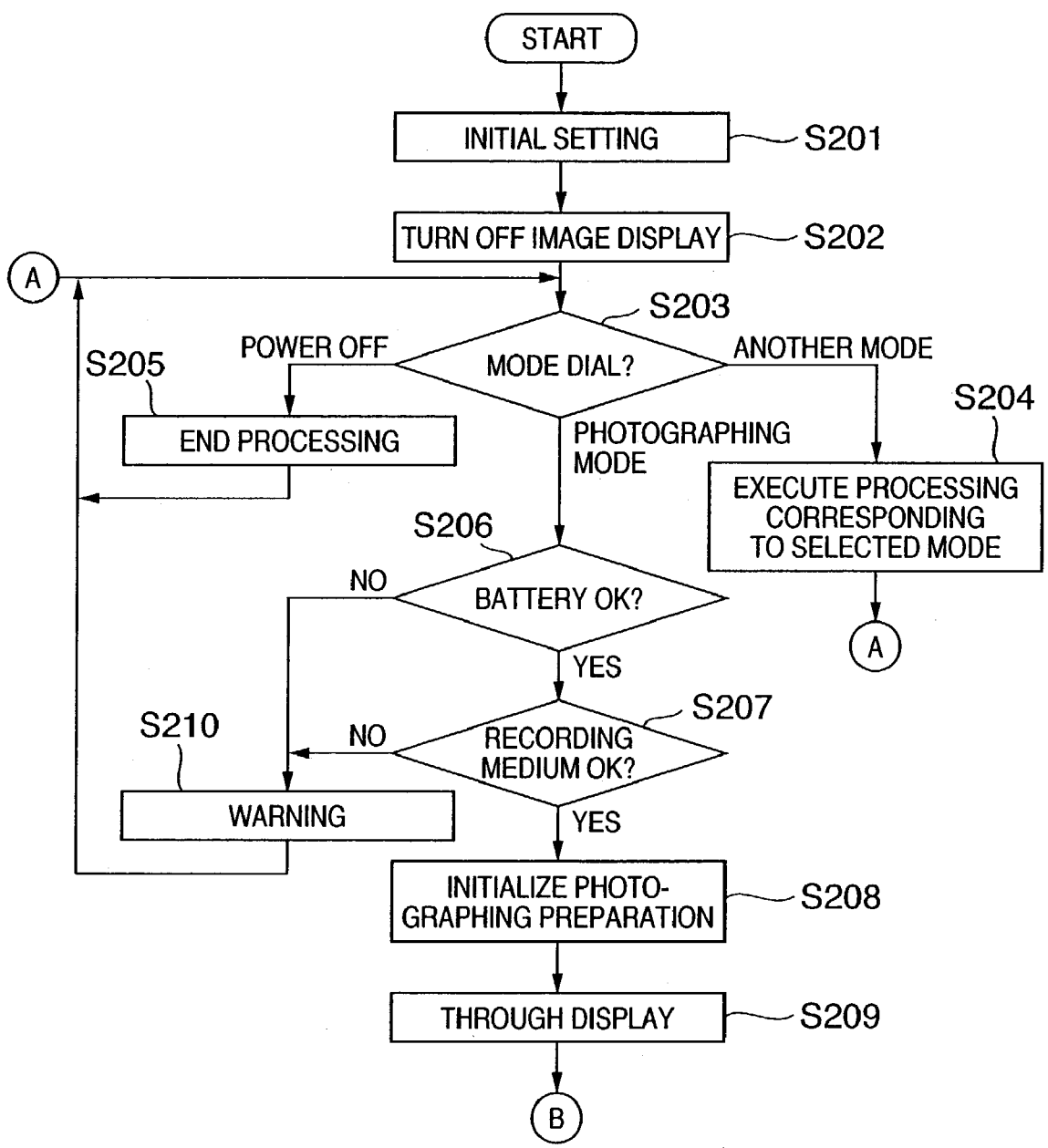
FIG. 2 is a flow chart for explaining the operation of the digital camera system according to the embodiment of the present invention.
Figure 3:
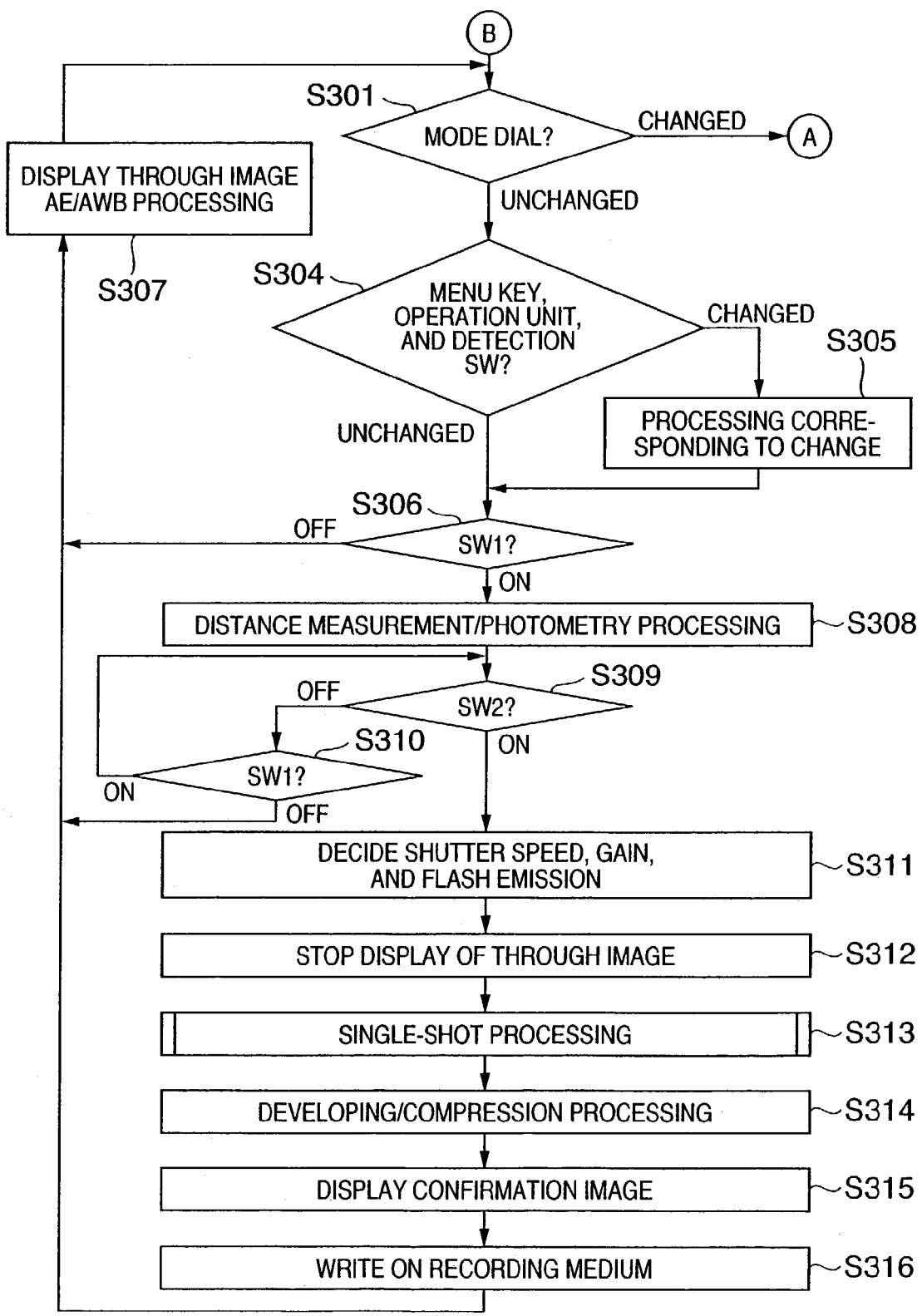
FIG. 3 is a flow chart for explaining the operation of the digital camera system according to the embodiment of the present invention.

FIGS. 2 and 3 are flow charts showing the main routine of the digital camera apparatus 100 according to the first embodiment.

The operation of the digital camera apparatus 100 will be explained with reference to FIGS. 2 and 3.

If the digital camera apparatus 100 is powered on by, e.g., replacing batteries, the CPU 50 initializes flags, control variables, and the like (S201), and initially sets the image display of the image display unit 28 to an OFF state (S202).

The CPU 50 determines the set position of the mode dial 60. If the mode dial 60 is set to power-off (S203), the CPU 50 performs predetermined end processing such that the display of each display unit is changed to an end state, the stop/shutter 12 is closed to protect the image sensing unit, necessary parameters including flags and control variables, set values, and set modes are stored in the memory 52, and unnecessary power supplies of the respective parts of the digital camera apparatus 100 including the image display unit 28 are turned off by the power control unit 80 (S205). After that, the processing returns to S203.

If the mode dial 60 is set to the photographing mode (S203), the processing advances to S206. If the mode dial 60 is set to another mode (S203), the CPU 50 executes processing corresponding to the selected mode (S204), and returns to S203 after processing.

The CPU 50 causes the power control unit 80 to determine whether the remaining capacity or operation status of the power source 86 including a battery or the like inhibits the operation of the digital camera apparatus 100 (S206). If the power source 86 has any problem, the CPU 50 generates a predetermined warning display by an image or sound using the image display unit 28 or display unit 54 (S210), and returns to S203.

If the power source 86 has no problem (S206), the CPU 50 determines whether the operation state of the recording medium 200 or a recording medium 210 inhibits the operation of the digital camera apparatus 100, and particularly image data recording/playback operation with respect to the recording medium (S207). If the operation state of the recording medium 200 or 210 has a problem, the CPU 50 generates a predetermined warning display by an image or sound using the image display unit 28 or display unit 54 (S210), and returns to S203.

If the operation state of the recording medium 200 or 210 has no problem (S207), the processing advances to S208. The CPU 50 initializes photographing preparation for displaying a through image on the image display unit 28 serving as a finder function (S208), and after preparation is completed, starts displaying the through image on the image display unit 28 (S209). Note that the through image is an image for confirming an object image sensed by the image sensing element 14.

Camera operation in response to an operation in the through image display state will be explained with reference to FIG. 3.

If the mode dial 60 has been changed (S301), the processing returns to S203 to check the dial state. If the mode dial 60 is not changed, whether the operation unit and detection SW have been changed is checked (S304). If the operation unit and detection SW have been changed, processing corresponding to the change is performed (S305).

If the shutter switch SW1 has not been pressed (S306), processing of keeping the through image displayed is done. The signal processing IC 22 performs predetermined photometry calculation for a signal obtained from the image sensing element 14, and stores the calculation result in the DRAM 30. The CPU 50 executes AE/AWB processing for the through image on the basis of the calculation result (S307). After that, the processing returns to S301.

If the shutter switch SW1 is pressed in S306, the CPU 50 executes distance measurement calculation to focus the photographing lens 10 on an object to be sensed, and executes photometry calculation to control the stop/shutter 12 to an f-number obtained in accordance with the program diagram of each photographing mode, on the basis of focus information and photometry information which are calculated by the signal processing IC 22 and stored in the DRAM 30 (S308). The state of the switch SW2 is then checked (S309). If the switch SW2 has not been pressed yet, the state of the shutter SW1 is checked again (S310). If the shutter SW1 is released, the processing returns to S307. If the switch SW1 is kept pressed, the state of the switch SW2 is kept monitored (S309).

If the switch SW2 has been pressed in S309, settings such as the photographing shutter speed, image sensing output gain, and flash emission are finally decided with reference to the current photometry result and the program diagram of each photographing mode (S311). The through image displayed on the image display unit 28 disappears (S312).

Next, the processing shifts to a photographing sequence. Single-shot processing of performing a series of photographing operations is executed (S313). After photographing processing, data before signal processing (to be referred to as raw data hereinafter) which is read out from the image sensing element 14 via the A/D converter 16 is saved in the DRAM 30. The signal processing IC 22 reads out the raw data from the DRAM 30 in accordance with an instruction from the CPU 50, and performs color correction on the basis of color correction information obtained by photographing processing (S314). Thereafter, the signal processing IC 22 performs developing/compression processing of converting the raw data into image data to be finally printed. The processed data is saved in the DRAM 30 (S315). The processed data is converted into a display image, which is stored in the DRAM 30. The signal processing IC 22 reads out the display image data at a predetermined rate, internally D/A-converts the data, and outputs the resultant data to the image display unit 28, displaying a confirmation image (S316). The compressed image data saved in the DRAM 30 in S315 is written in the recording medium 200 (S317), and the processing returns to S307.

Figure 4:
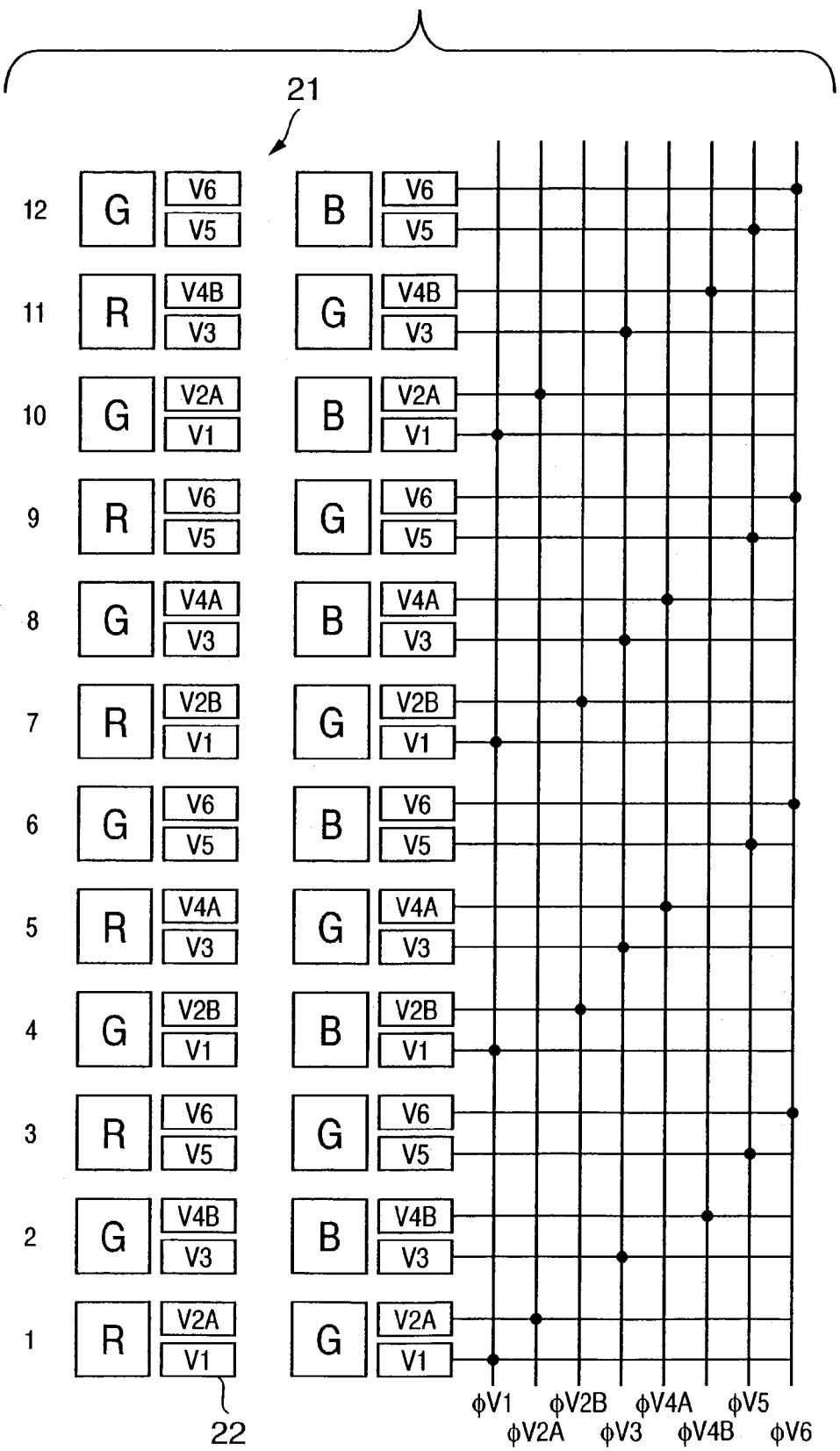
FIG. 4 is a schematic view showing the color filter layout and electrode layout of the pixels of an image sensing element in the digital camera system according to the embodiment of the present invention.

FIG. 4 shows the color filter layout and electrode layout of the pixels of the image sensing element 14 by two horizontal pixels and 12 vertical pixels. These layouts are repeated in the horizontal and vertical directions. Reference numeral 21 denotes each pixel to which a color filter is adhered. Horizontal pixel lines on which red (R) and green (G) are repeated, and horizontal pixel lines on which green (G) and blue (B) are repeated are alternately arrayed in the vertical direction. Reference numeral 22 denotes each vertical CCD transfer electrode. One pixel corresponds to two vertical CCD transfer electrodes.

Signals can be transferred in six phases by applying six-phase driving pulses φV1, φV2A, φV2B, φV3, φV4A, φV4B, φV5, and φV6 to transfer electrodes V1, V2A, V2B, V3, V4A, V4B, V5, and V6, respectively. Of the six-phase driving pulses, pulses φV2A, φV2B, φV4A, and φV4B which concern charge transfer of the vertical CCD are identical.

A read pulse in the first field is applied to the transfer electrodes V2A and V2B also serving as read electrodes to read out charges from the first, fourth, seventh, and 10th horizontal pixel lines to the vertical CCD.

A read pulse in the second field is applied to the transfer electrodes V4A and V4B also serving as read electrodes to read out charges from the second, fifth, eighth, and 11th horizontal pixel lines to the vertical CCD.

A read pulse in the third field is applied to the transfer electrode V6 also serving as a read electrode to read out charges from the third, sixth, ninth, and 12th horizontal pixel lines to the vertical CCD.

The transfer electrode V2A reads out charges from the first and 10th horizontal pixel lines to the vertical CCD. The transfer electrode V2B reads out charges from the fourth and seventh horizontal pixel lines to the vertical CCD. The transfer electrode V4A reads out charges from the fifth and eighth horizontal pixel lines to the vertical CCD. The transfer electrode V4B reads out charges from the second and 11th horizontal pixel lines to the vertical CCD.

Figure 5:
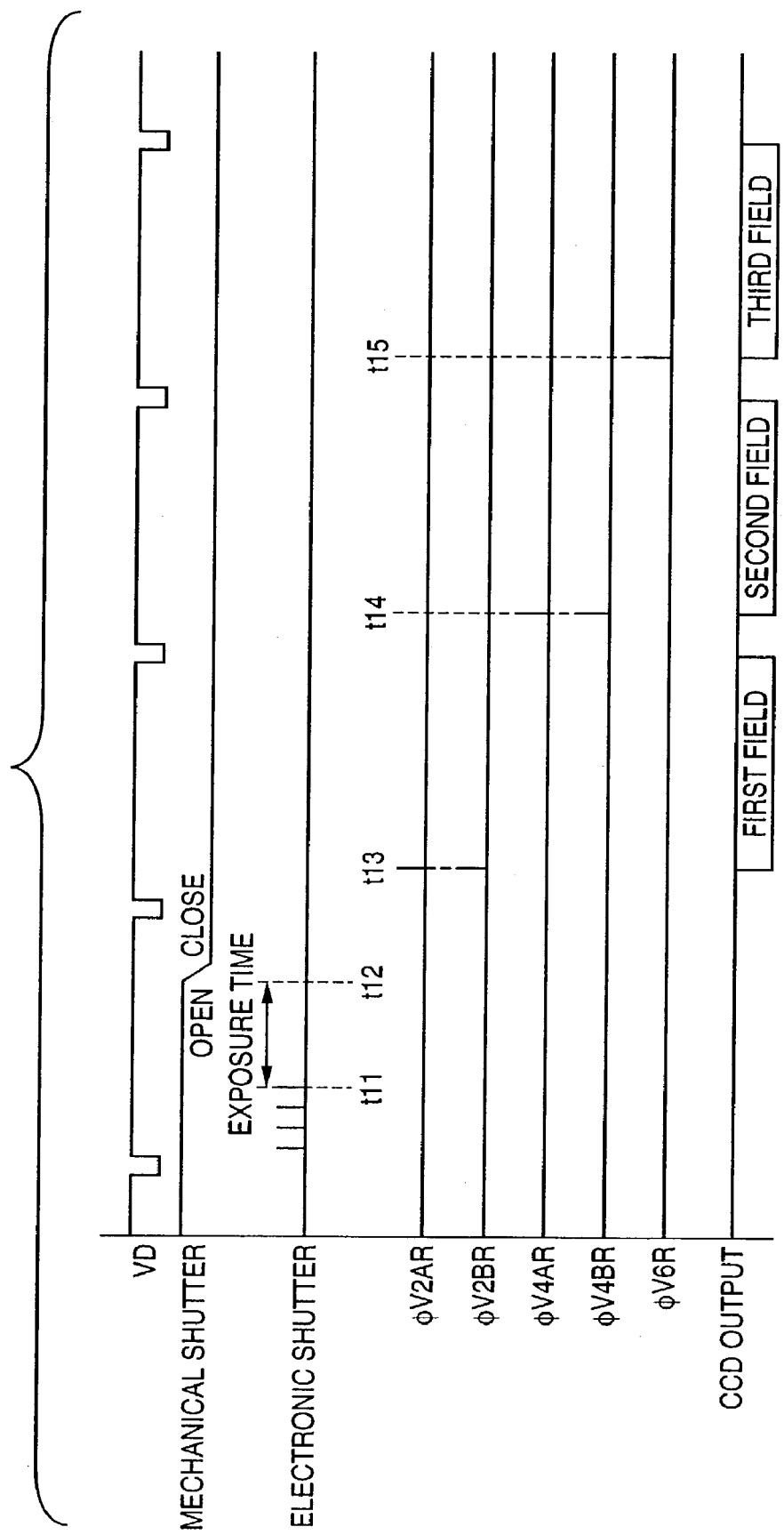
FIG. 5 is a timing chart showing read of image data from a 3-field read type image sensing element according to the embodiment of the present invention.
Figure 6:
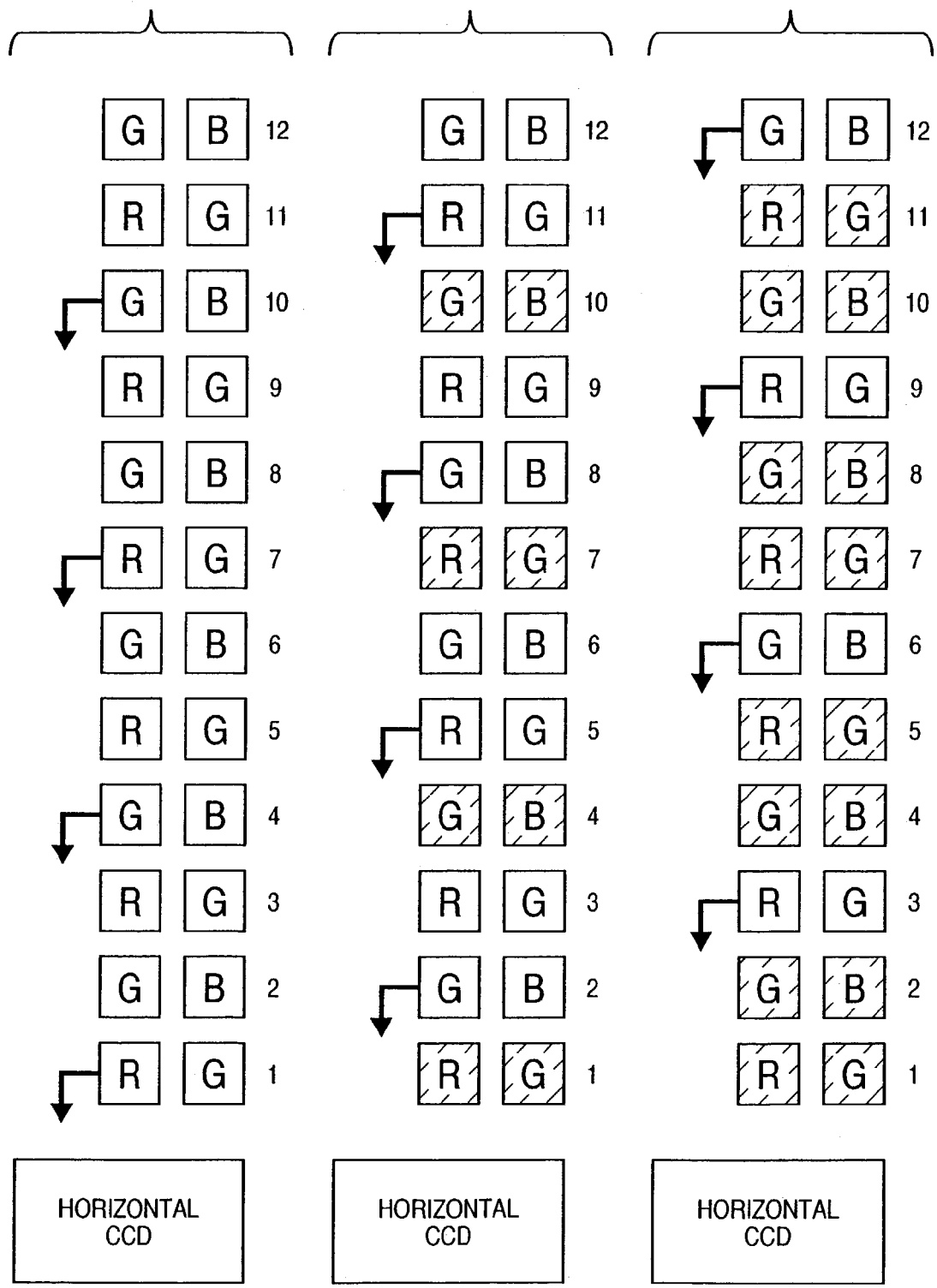
FIGS. 6A to 6C are schematic views showing read of image data from the 3-field read type image sensing element according to the embodiment of the present invention.
Figure 11:
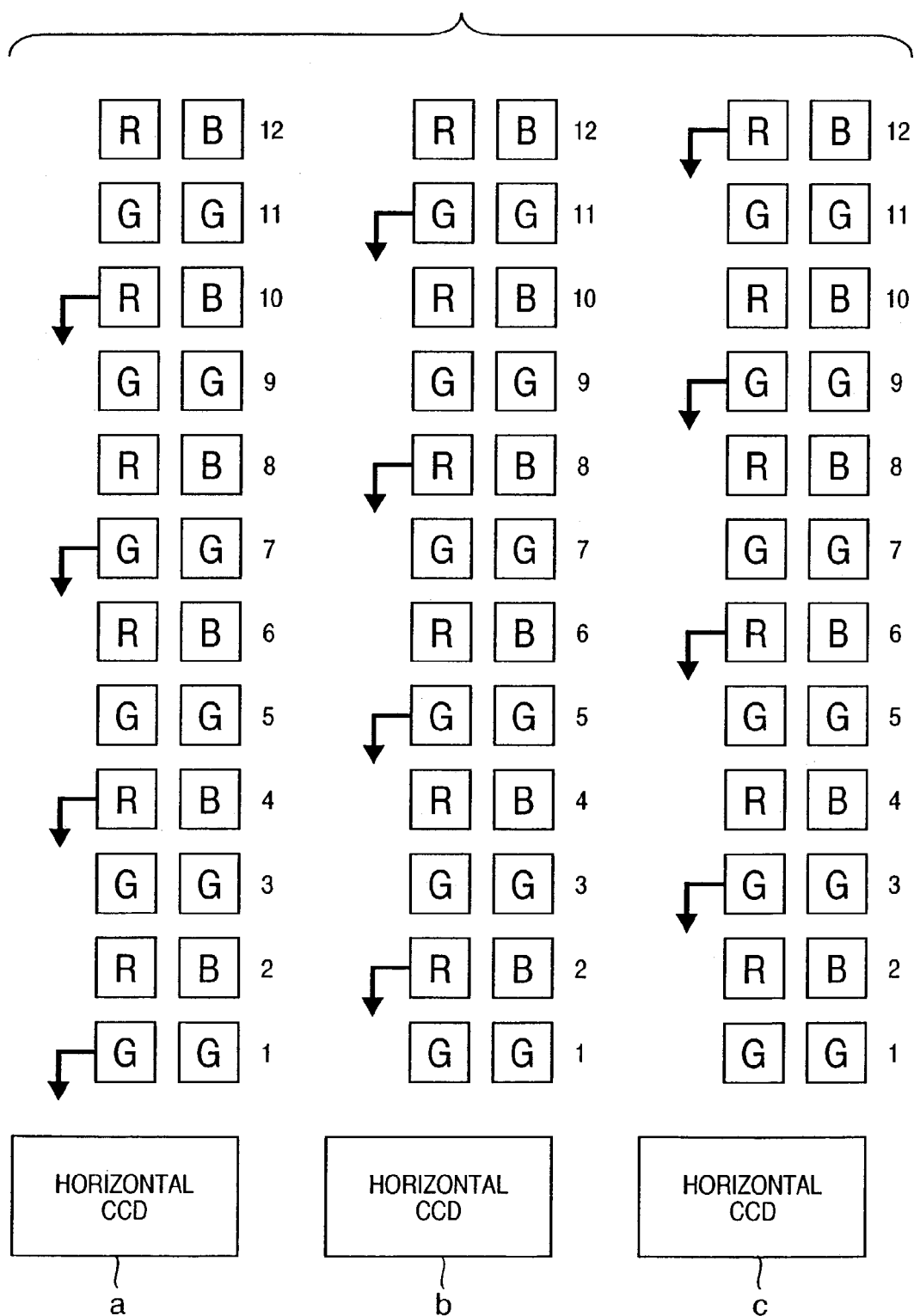
FIG. 11 is a schematic view showing an example of a pixel layout for read of image data from the 3-field read type image sensing element according to the embodiment of the present invention.

CCD read in photographing will be explained with reference to the timing chart of FIG. 5 and the pixel layout of FIGS. 6A to 6C. Note that the pixel layout may be one as shown in FIG. 11 as far as three R, G, and B color signals in one field are read out in synchronism with each other. Assume that the photographing mode is a mode in which charges are read out from all pixels in three fields, and the number of vertical pixels is 1,440. VD is a vertical sync signal, the mechanical shutter controls exposure by opening/closing it, and the electronic shutter controls exposure by applying a pulse to the substrate potential of a solid-state image sensing element and removing pixel charges in the substrate direction. The exposure time is an interval between time t11 at which the electronic shutter pulse ends and time t12 at which the mechanical shutter is closed.

Driving pulses φV2AR, φV2BR, φV4AR, φV4BR, and φV6R represent only read pulses respectively applied to φV2A, φV2B, φV4A, φV4B, and φV6. A CCD output is an output from the image sensing element 14. At time t13, read pulses are applied to φV2AR and φV2BR, and charges are read out to the vertical CCD from the first horizontal pixel line (R-G line), fourth horizontal pixel line (G-B line), seventh horizontal pixel line (R-G line), and 10th horizontal pixel line (G-B line). This state is illustrated in FIG. 6A, and these charges are output in the first field of the CCD output. Signals are output from ⅓ the number of vertical pixels. At time t14, read pulses are applied to φV4AR and φV4BR, and charges are read out to the vertical CCD from the second horizontal pixel line (G-B line), fifth horizontal pixel line (R-G line), eighth horizontal pixel line (G-B line), and 11th horizontal pixel line (R-G line). This state is illustrated in FIG. 6B, and these charges are output in the second field of the CCD output. Signals are output from ⅓ the number of vertical pixels. At time t15, a read pulse is applied to φV6R, and charges are read out to the vertical CCD from the third horizontal pixel line (R-G line), sixth horizontal pixel line (G-B line), ninth horizontal pixel line (R-G line), and 12th horizontal pixel line (G-B line). This state is illustrated in FIG. 6C, and these charges are output in the third field of the CCD output. Signals are output from ⅓ the number of vertical pixels. The output signals in the three fields are temporarily saved in the DRAM 30, similar to the pixel layout, subjected to image processing by the signal processing circuit, and then saved in the DRAM 30 again.

In a conventional interlaced read type primary-color CCD, pixels obtained by one field are either a combination of R and G pixels or a combination of G and B pixels. By only one field, all pieces of information cannot be obtained, and information necessary for white balance calculation such as brightness information is insufficient. In the 3-field read system, pixels read in each field contain both a horizontal pixel line of R and G and a horizontal pixel line of G and B, as described above. Even if read of all fields is not completed, pieces of R, G, and B information can be attained before the completion of read of one field. The white balance of the photographed image can be corrected.

Figure 7:
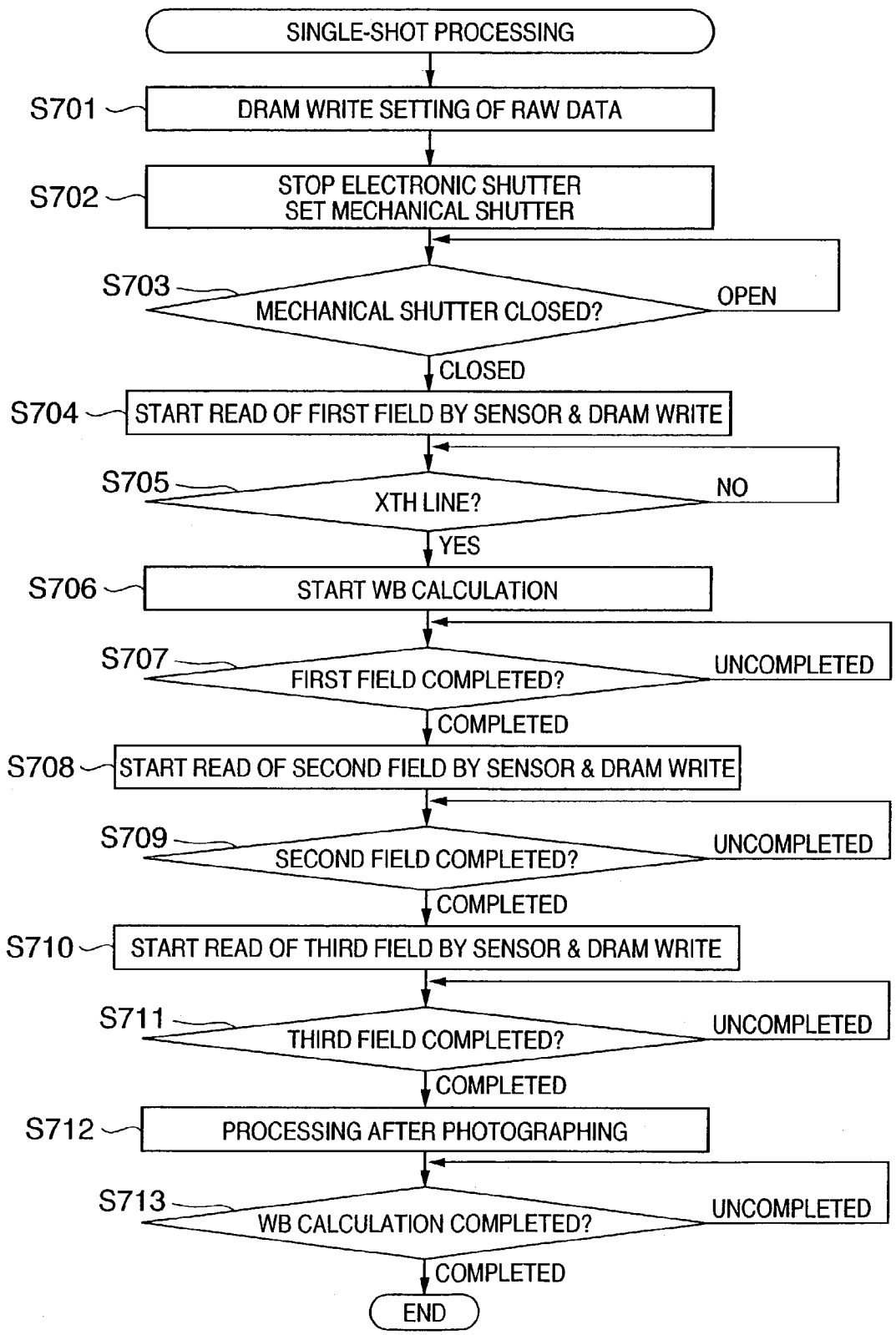
FIG. 7 is a flow chart showing single-shot processing in the digital camera system according to the embodiment of the present invention.

FIG. 7 is a flow chart showing single-shot processing in detail. A series of operations such as exposure, closing of the shutter, sensor read, and white balance calculation are executed.

The CPU 50 performs DRAM write setting for temporarily saving raw data in the DRAM 30 (S701). In write setting in the DRAM 30, the DMA controller in the signal processing IC 22 is so set as to write data every three lines in accordance with the 3-field read system instead of successively writing data in the memory. The CPU 50 issues an electronic shutter stop instruction to the timing generator 18, and starts exposure. The CPU 50 sets the shutter closing timing of the stop/shutter 12 in the internal timer of the CPU in accordance with a decided shutter speed (S702). The internal timer of the CPU is so designed as to output a pulse which completely closes the stop/shutter 12 upon the lapse of a designated time. The processing waits until the mechanical shutter is closed (S703). If the stop/shutter 12 is closed, the CPU 50 issues a write start instruction to the first field in accordance with the write setting in S701 in the DRAM areas set in S701, and instructs the timing generator 18 to read out image sensing data of the first field from the image sensing element 14 (S704). The processing waits until data is transferred from the Xth line (Xth line is the second or subsequent line up to which all pieces of R, G, and B color information are obtained) of the first field (S705). If data is transferred from the Xth line, the signal processing IC 22 sequentially reads out image data up to the middle of the first field which is written in the DRAM 30, and starts WB (White Balance) calculation (S706). At this time, color correction information obtained as a result of WB calculation is saved in another area of the DRAM 30. The processing waits for the completion of raw data write operation of the first field in the DRAM 30 (S707). After that, the CPU 50 issues a write start instruction to the second field in accordance with write setting in S701, and instructs the timing generator 18 to read out image sensing data of the second field from the image sensing element 14 (S708).

The processing waits for the completion of raw data write operation of the second field in the DRAM 30 (S709). After that, the CPU 50 issues a write start instruction to the third field, and instructs the timing generator 18 to read out image sensing data of the third field from the image sensing element 14 (S710). The processing waits for the completion of raw data write operation of the third-field in the DRAM 30 (S711).

Thereafter, post-photographing processing of opening the mechanical shutter and restarting electronic shutter operation is so executed as to quickly perform the next photographing (S712). The processing waits for the completion of WB calculation which has started in S706 (S713). Upon the completion of WB calculation, photographing processing ends.

In the method of deciding the Xth line in S705, the completion of DRAM write in the first field must be guaranteed to end before the completion of DRAM read in WB calculation.

Figure 8:
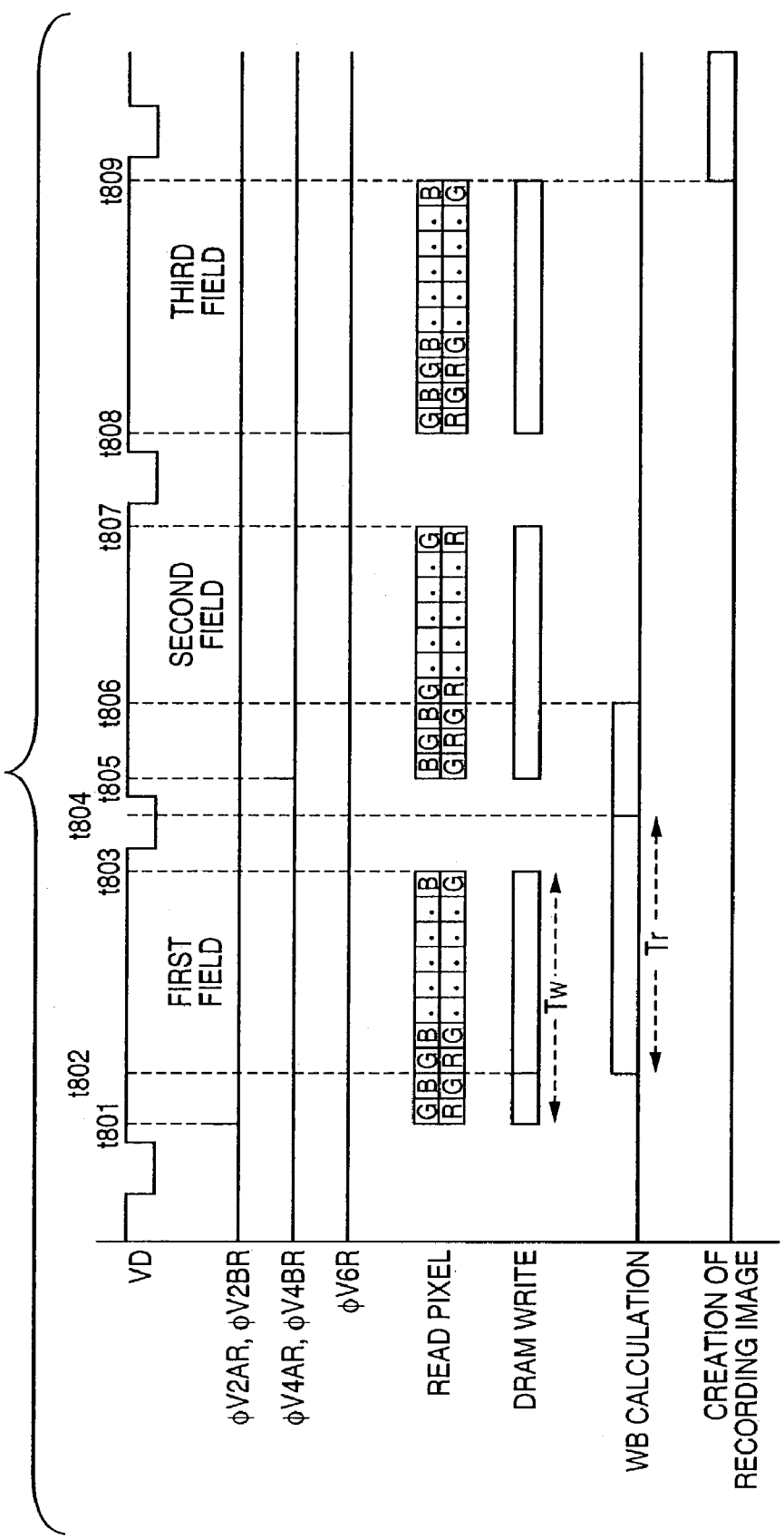
FIG. 8 is a timing chart showing read of image data from an image sensing element in an image sensing apparatus according to the first embodiment of the present invention.

FIG. 8 is a timing chart showing pixels read to the DRAM for X=2, the start of WB calculation, and creation of various images.

At the timing of time t801 in FIG. 8, the read pulses φV2AR and φV2BR are output from the timing generator 18. Of image data accumulated in the light-receiving portion of the image sensing element, data from pixels represented by FIG. 6A are output every three lines to the DRAM 30 via the image sensing element 14, preprocessing circuit 15, A/D converter 16, and signal processing IC 22. At time t802, raw data up to the second line of the first field have been read out. Memory read for WB calculation starts at this timing, and ends at time t804. At time t806, WB calculation is completed.

Read of the first field from the image sensing element 14 is completed at time t803, and data from ⅓ all the pixels are completely stored in the DRAM 30. At time t805, the timing generator 18 outputs the second field read pulses φV4AR and φV4BR. Of image data at the light-receiving portion, data from pixels represented by FIG. 6B are output every three lines to the DRAM 30 via the image sensing element 14, preprocessing circuit 15, A/D converter 16, and signal processing IC 22. At time t807, read of raw data of the second field is completed. Similarly, at time t808, the timing generator 18 outputs the third field read pulse φV6R. Of image data at the light-receiving portion, data from pixels represented by FIG. 6C are output every three lines to the DRAM 30 via the image sensing element 14, preprocessing circuit 15, A/D converter 16, and signal processing IC 22. At time t809, read of raw data of the third field is completed.

In the 3-field read type image sensing element of the first embodiment, DRAM read in WB calculation does not pass transfer operation of image sensing data in the first field to the DRAM 30 as far as the relation:

(driving rate of image sensing element)>(DRAM read rate in WB calculation)

is established. X can be set to about several lines with a margin.

If this relation is not established, the WB calculation start time t802 must be decided as far as, letting Tr be the time necessary for memory read in WB calculation in FIG. 8, the relation:

$t803 - t802 < Tr$ is established. This is because, if the above relation is not established, DRAM read for WB calculation may end before raw data of one field read out from the CCD are completely stored in the DRAM 30, and indefinite data before storage may be read out. As is apparent from FIG. 8, WB calculation can end more quickly as t802 is closer to t801.

As described above, according to the first embodiment, WB calculation operation starts from the middle of the first field, and is completed within the image sensing signal read period. No special WB calculation time need be set after read of image data of one frame, contributing to shortening the total image processing time after photographing.

The first embodiment has exemplified single-shot photographing, and is also effective for sequential shooting. Generally in sequential shooting, WB calculation is done for only the first image, and the WB coefficient for the first image is often used as WB coefficients for the second and subsequent images. In this case, the conventional sequential shooting interval between the first and second images is longer than the sequential shooting interval between the second and subsequent images, and it is difficult to synchronize the timing. According to the first embodiment, WB calculation is executed parallel to read of the image sensing signal of the first field, and completed at the same time as the completion of read of all fields. This embodiment can realize sequential shooting at almost the same interval from the first image. When WB calculation is performed every photographing of not only the first image but the second and subsequent images in sequential shooting, the WB calculation time can be contained in the image sensing signal read time, and executed without decreasing the sequential shooting speed.

Second Embodiment

In the first embodiment described above, WB calculation starts by using image sensing signals obtained from the first field, and ends at the middle of the second field. If the remaining image sensing signal read period is utilized, an image confirmation display image (rec review image) or a simple reduced image (thumbnail image) can be created using image data which are read out from the first field and are smaller than the image data amount of one frame. This can be realized by performing image conversion by a signal processing IC 22 on the basis of the image sensing signals of the first field and the WB calculation result, and saving the converted image in another area of a DRAM 30. Image creation including WB calculation is so basically designed as to be executed by interrupt driving, and can be performed parallel to read of an image sensing signal.

Figure 9:
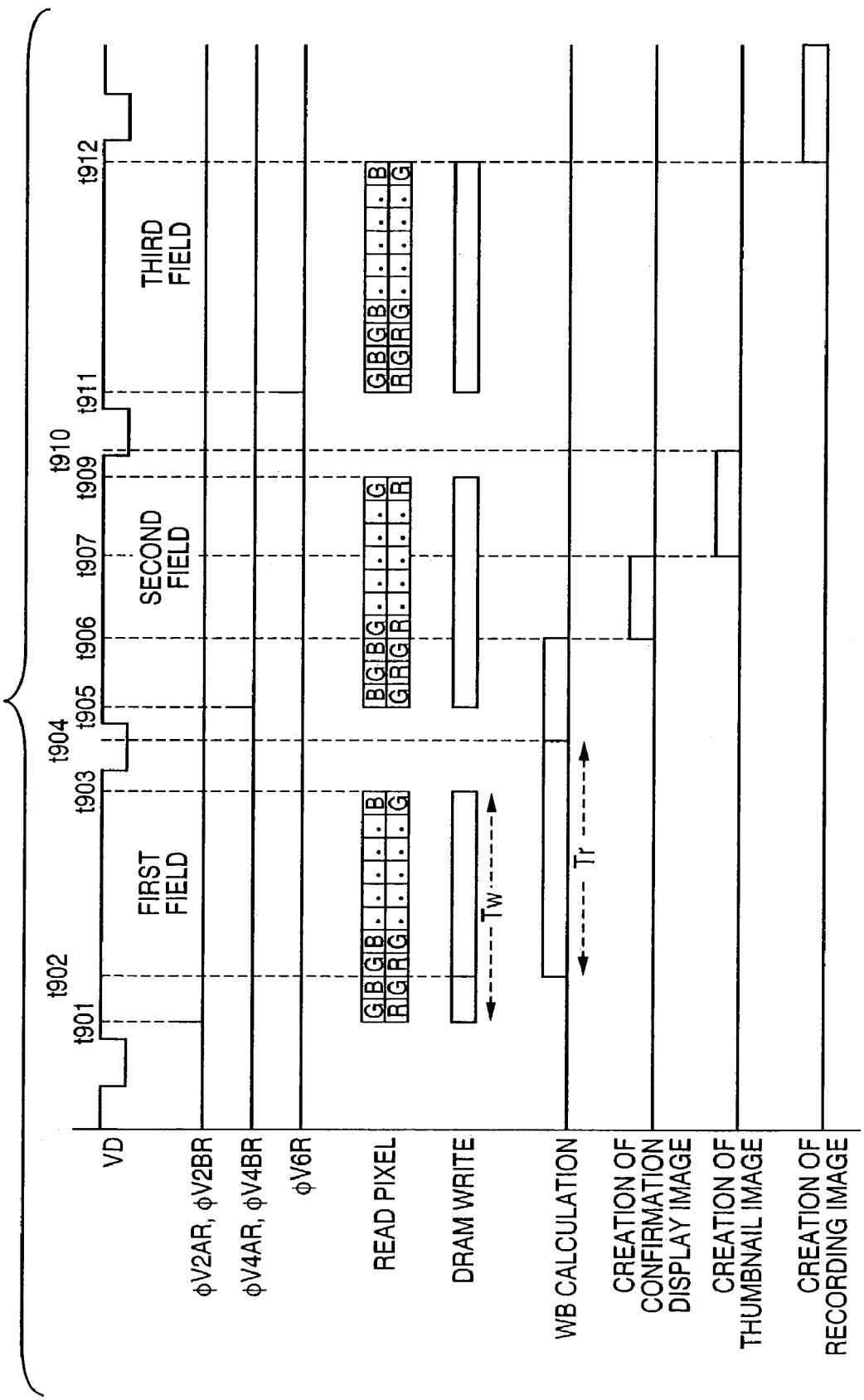
FIG. 9 is a timing chart showing read of image data from an image sensing element in an image sensing apparatus according to the second embodiment of the present invention.

FIG. 9 is a timing chart showing pixels read to the DRAM, the start of WB calculation, and creation of various images according to the second embodiment. At the timing of time t901 in FIG. 9, read pulses φV2AR and φV2BR are output from a timing generator 18. Of image data accumulated in the light-receiving portion of an image sensing element, data from pixels represented by FIG. 6A are output every three lines to the DRAM 30 via an image sensing element 14, a preprocessing circuit 15, an A/D converter 16, and the signal processing IC 22. At time t902, raw data up to the second line of the first field have been read out. Memory read for WB calculation then starts, and ends at time t904. At time t906, WB calculation is completed.

Read of the first field from the image sensing element 14 is completed at time t903, and data from ⅓ all the pixels are completely stored in the DRAM 30. At time t905, the timing generator 18 outputs second field read pulses φV4AR and φV4BR. Of raw data at the light-receiving portion, data from pixels represented by FIG. 6B are output every three lines to the DRAM 30 via the image sensing element 14, preprocessing circuit 15, A/D converter 16, and signal processing IC 22. At time t908, read of raw data of the second field is completed. Similarly, at time t911, the timing generator 18 outputs a third field read pulse φV6R. Of image data at the light-receiving portion, data from pixels represented by FIG. 6C are output every three lines to the DRAM 30 via the image sensing element 14, preprocessing circuit 15, A/D converter 16, and signal processing IC 22. At time t912, read of raw data of the third field is completed.

In the second embodiment, a rec review display image and thumbnail image are created in the remaining time, i.e., during transfer of image data from the image sensing element to the DRAM 30 on the basis of the fact that WB calculation is completed at time t906. At time t906, the CPU issues to the signal processing IC 22 an instruction for starting creation of a rec review display image. The signal processing IC 22 reads out from the DRAM 30 raw data of the first field and color correction information obtained from the raw data as a result of WB calculation. The signal processing IC 22 converts the data into one suitable for display, adjusts the image size, and saves the resultant data in the DRAM 30 (completed at time t907). The display image data is repetitively read out and output to the image display unit 28, realizing a rec review display.

Similar to the rec review display, creation of a thumbnail image (reduced image) for displaying a list can use raw data of the first field and color correction information obtained from the raw data as a result of WB calculation. At time t907, the CPU issues to the signal processing IC 22 an instruction for starting creation of a thumbnail image. The signal processing IC 22 reads out the image of the first field from the DRAM 30, converts the image into data suitable for a thumbnail image, adjusts the image size, and saves the resultant data in the DRAM 30 (completed at time t910).

At time t910, all raw data of one frame are saved in the DRAM 30. The raw data, and color correction information obtained from raw data of the first field as a result of WB calculation are read out. Developing/compression processing of creating a recording image is performed, and the compressed image data are saved in the DRAM 30.

In the second embodiment, WB calculation and also creation of a rec review display image and thumbnail image are performed while raw data are read out from the image sensing element and transferred to the DRAM. The image processing speed after photographing can be further increased, and the rec review display after photographing can also be quickly displayed.

Third Embodiment

In the first and second embodiments, WB calculation is done in only the first field, and color correction information obtained as a result of calculation is also exploited to create a recording image. The white balance is corrected using an image prepared by vertically sampling the entire frame into ⅓. For example, to read out image sensing data from an odd number of (e.g., five) fields of one frame larger than three fields, the white balance may not be accurately corrected by only some fields. In the third embodiment, color correction is performed using a WB calculation result using image data of the first field in order to create a rec review display image and thumbnail image. To create an actual image (image to be recorded) larger in data amount than a simple image such as a thumbnail image, WB calculation and color correction are done by using image data of all fields.

Figure 10:
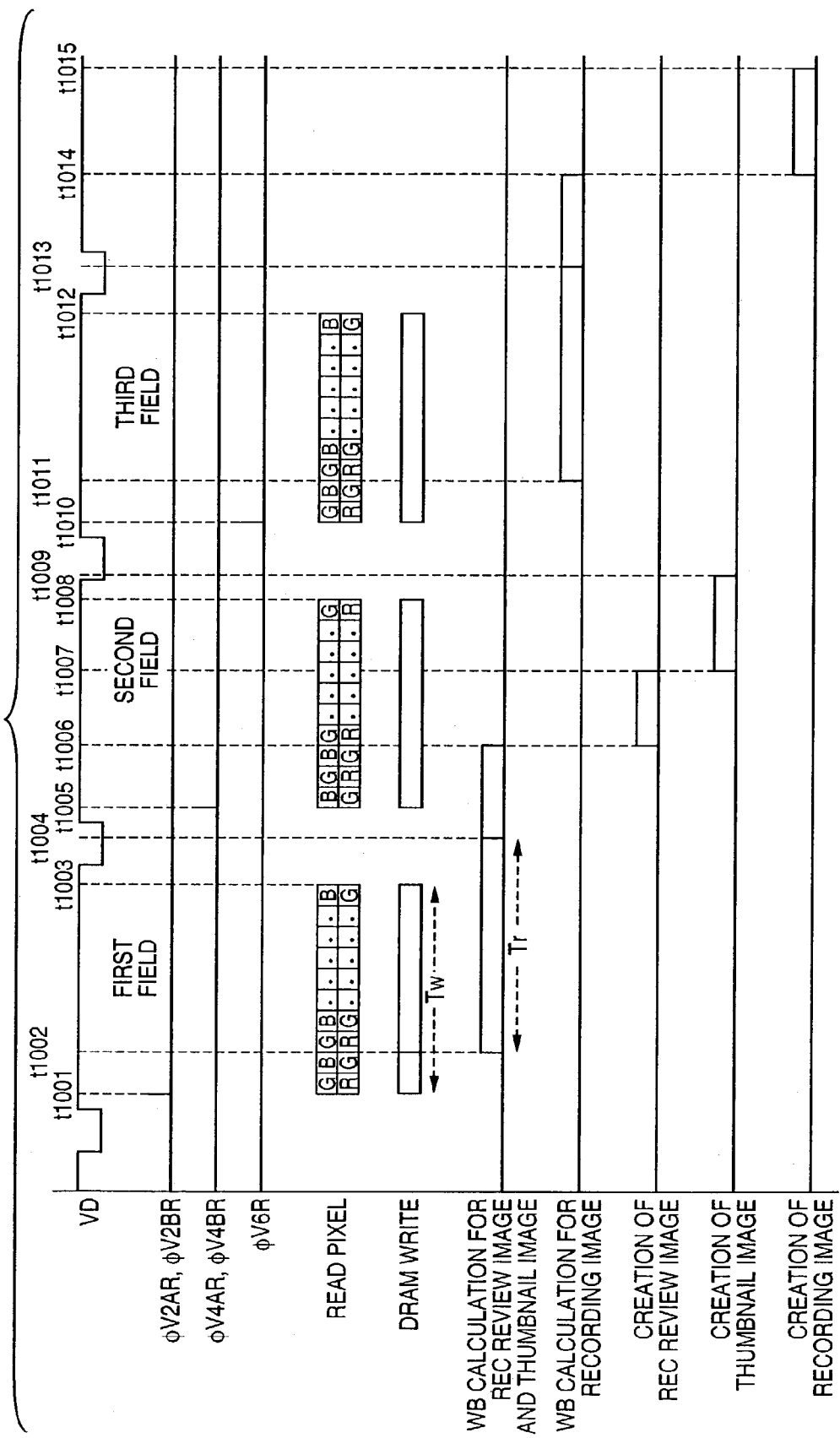
FIG. 10 is a timing chart showing read of image data from an image sensing element in an image sensing apparatus according to the third embodiment of the present invention.

FIG. 10 is a timing chart showing pixels read to the DRAM, the start of WB calculation, and creation of various images according to the third embodiment. Read of raw data from an image sensing element is the same as those in the first and second embodiments, and a description thereof will be partially omitted.

At t1001, first field read pulses φV2AR and φV2BR for the first field are generated. At t1002, while raw data of the first field which are saved in the DRAM up to the middle of the first field are read out, WB calculation of a rec review display image and thumbnail image starts. At t1006, WB calculation ends. At an interval between t1006 and t1007, a rec review image is created parallel to read of the second field. At an interval between t1007 and t1008, a thumbnail image is created. A third field read pulse φV6R is generated at t1010, and WB calculation of a recording image (actual image) is performed at t1011. At this time, not raw data of some fields but raw data of the frame are read out and subjected to WB calculation. At t1012, all raw data of the third field from the image sensing element are stored in the DRAM. At t1014, WB calculation of the recording image ends. Creation of the recording image starts by using color correction information obtained as a result of WB calculation, and ends at t1015.

In the third embodiment, a rec review display image and thumbnail image are created by using raw data of some fields and executing white balance calculation after photographing. This can shorten the time until the next photographing. To the contrary, a recording image undergoes white balance calculation using raw data of a frame after photographing, and more accurate color correction can be achieved.

Fourth Embodiment

The first to third embodiments adopt a 3-field read type image sensing element. The present invention can also be applied to an image sensing element comprised of a larger odd number of fields.

As raw data obtained from some fields, raw data of the first field is used to perform WB calculation. Alternatively, raw data of another field or added fields may be used.

As described above, according to the first to fourth embodiments, the light-receiving portion can be effectively utilized by an image sensing element which reads out data from a plurality of fields (three fields or a larger odd number of fields). While the sensor size is suppressed small, the number of pixels can be increased. After photographing, white balance calculation is executed parallel to read of an image sensing signal from the image sensing element. White balance calculation is performed using only some of a plurality of fields after photographing. The time taken to set the next photographing ready state after photographing can be shortened.

With the use of the WB calculation result, creation of a rec review display image can also be executed parallel to read of an image sensing signal. The time taken to display a rec review image after photographing can be shortened.

In sequential shooting, the time conventionally taken for WB calculation can be eliminated in both a case wherein a WB coefficient obtained from WB calculation of the first image is used for the second and subsequent images, and a case wherein WB calculation is performed every photographing. The photographing interval between the first and second images does not become longer than the photographing interval between the second and subsequent images. Compared to the prior art, higher-speed sequential shooting can be achieved at almost the same interval.

Other Embodiment

Although, in the above description, WB calculation has been explained as a calculation processing (image processing) for the image sensing which is performed by using some fields in a plurality of fields, another image processing may be performed. For example, generation processing of thumbnail images, generation processing of a rec review image, thru image display of a electric view finder when image sensing, AE processing (generation of a luminance signal), AF processing, gamma processing, region extraction processing etc. may be performed. In these cases, a color temperature information obtained from an external color temperature sensor or a WB coefficient obtained from a electric view finder display just before an image sensing may be used. An image processing time in image sensing or after image sensing can be reduced by the above processing.

Further, a file size can be controlled by reading out some fields and previously compressing the fields and using the compressing result in a compressing operation after reading out of one frame.

The present invention may be applied to a system including a plurality of devices (e.g., a host computer, interface device, reader, and printer) or an apparatus (e.g., a copying machine or facsimile apparatus) formed from a single device.

The object of the present invention is also achieved when a storage medium (or recording medium) which stores software program codes for realizing the functions of the above-described embodiments is supplied to a system or apparatus, and the computer (or the CPU or MPU) of the system or apparatus reads out and executes the program codes stored in the storage medium. In this case, the program codes read out from the storage medium realize the functions of the above-described embodiments, and the storage medium which stores the program codes constitutes the present invention. The functions of the above-described embodiments are realized when the computer executes the readout program codes. Also, the functions of the above-described embodiments are realized when an OS (Operating System) or the like running on the computer performs part or all of actual processing on the basis of the instructions of the program codes.

The functions of the above-described embodiments are also realized when the program codes read out from the storage medium are written in the memory of a function expansion card inserted into the computer or the memory of a function expansion unit connected to the computer, and the CPU of the function expansion card or function expansion unit performs part or all of actual processing on the basis of the instructions of the program codes.

When the present invention is applied to the storage medium, the storage medium stores program codes corresponding to the above-mentioned flow charts.

As has been described above, the above-described embodiments can quickly complete white balance calculation after photographing.

Note that the image sensing means of the digital camera 100 is a CCD in the above-described embodiments, but may be a CMOS sensor or the like.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus comprising:
   an image sensing element which outputs first, second, and third color components of color filters on pixels in one field;
   an image sensing controller which forms an image of one frame by n fields (n is an odd number of not less than 3), and reads out pixel data of said image sensing element so as to contain all color components in each 1-field period;
   a storage device which writes the pixel data of said image sensing element read out by said image sensing controller, and reads out the pixel data;
   a determination device which determines whether pixel data of predetermined lines is read out from said image sensing element or not, wherein the predetermined lines are set in accordance with a comparison of a driving rate of said image sensing element with a read out rate of said storage device for white balance processing; and
   a processing device which starts white balance calculation on the basis of the pixel data read out from said storage device in case said determination device determines that pixel data of the predetermined lines is read out from said image sensing element in a period between an image sensing instruction being input and read of one frame from said image sensing element being completed by said image sensing controller.

2. The apparatus according to claim 1, wherein said image sensing controller performs interlaced read of reading every n lines in each field and forming an image of one frame.

3. The apparatus according to claim 1, wherein
   the apparatus further comprises a display device which displays a photographed image, and
   said controller causes said display device to start display of a photographed image on the basis of image data of a field which has already been read before read of image data of one frame from said image sensing element is completed.

4. The apparatus according to claim 1, wherein
   the apparatus further comprises a reduced-image formation device which forms a reduced image smaller in data amount than image data of one frame, and
   said controller causes said reduced-image formation device to form a reduced image before read of image data of one frame from said image sensing element is completed.

5. An image sensing method using an image sensing apparatus having an image sensing element which outputs first, second, and third color components of color filters on pixels in one field, comprising:
   controlling an image sensing element to form an image of one frame by n fields (n is an odd number of not less than 3), and read out pixel data of the image sensing element so as to contain all color components in each 1-field period;
   writing in a storage device the pixel data of said image sensing element read out by said image sensing control, and reading the pixel data out from the storage device;
   determining whether pixel data of predetermined lines is read out from said image sensing element or not, wherein the predetermined lines are set in accordance with a comparison of a driving rate of said image sensing element with a read out rate of said storage device for white balance processing; and
   starting white balance calculation on the basis of the pixel data read out from the storage device in case said determination determines that pixel data of the predetermined lines is read out from said image sensing element in a period between an image sensing instruction being input and read of one frame from the image sensing element being completed.

6. The method according to claim 5, wherein interlaced read of reading every n lines in each field and forming an image of one frame is performed.

7. The method according to claim 5, wherein
   the method further comprises a display step of displaying a photographed image, and
   display of an image starts before read of image data of one frame from the image sensing element is completed.

8. The method according to claim 5, wherein
   the method further comprises performing a reduced-image formation to form the reduced image smaller in data amount than image data of one frame, and
   the reduced-image formation is performed before read of image data of one frame from the image sensing element is completed in a temporary storage.

9. A computer-readable medium encoded with a computer program causing a computer to execute an image sensing method defined in claim 5.

* * * * *